United States Patent Office 2,958,503
Patented Nov. 1, 1960

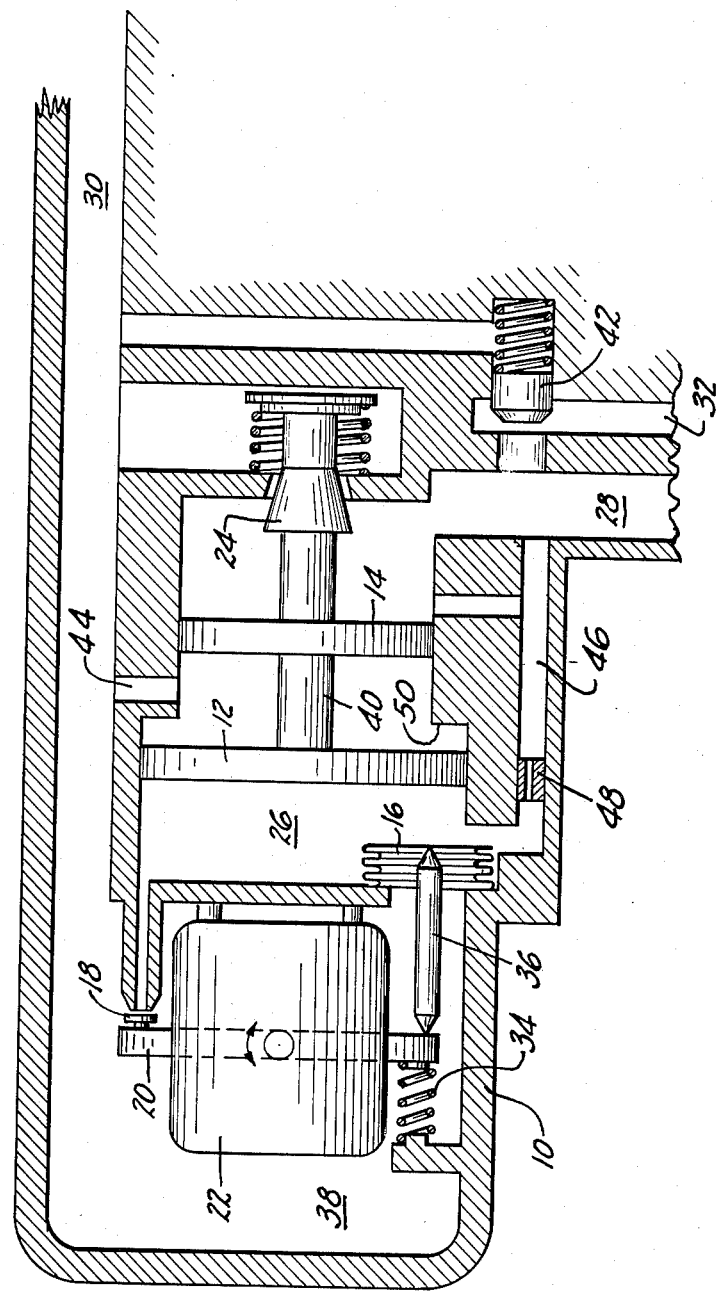
INVENTOR.
THOMAS R VAUGHN
BY
ATTORNEY

2,958,503
BELLOWS COMPENSATION FOR SERVO VALVE

Thomas R. Vaughn, South Bend, Ind., assignor to The Bendix Corporation, a corporation of Delaware Filed May 4, 1955, Ser. No. 505,970

7 Claims. (Cl. 251—30)

This invention relates to hydraulically operated servo systems. More specifically, the present invention relates to a bellows compensation for servo pressure variation.

It is an object of this invention to provide a simple means for compensating for variations in servo pressure.

It is another object of this invention to provide a bellows arrangement which may be used in conjunction with either electrically or mechanically operated servo valves.

It is another object of this invention to provide, in a servo system, a simple and straightforward means for compensating for piston loading factors which, if not compensated for, may result in spurious output signals.

Other objects and advantages will readily become apparent from the following description and drawings, wherein:

The single figure is a sectional view of a servo system embodying my invention.

Referring to the drawing, numeral 10 designates a casing containing pistons 12 and 14, a bellows 16 and a servo valve 18 connected to a torque motor armature 20. Also housed in the casing are a torque motor 22, a fuel valve 24, and a variable volume chamber 26.

The casing 10 has an inlet port 28 communicating with a source of high pressure fluid, an outlet port 30 connected to an engine manifold, and a pump return port 32. The torque motor 22 secured to casing 10 communicates with a source producing an electrical output signal and is adapted to actuate a servo valve 18 secured to one end of the torque motor armature 20. The opposite end of the armature 20 is subjected on one side to the force exerted by a spring 34 which displaces the armature against a rod 36 disposed between the bellows 16 and the armature. The bellows 16, fixedly secured to casing 10, acts as a fluid seal between chamber 26 and chamber 38 housing the torque motor 22. The pistons 12 and 14 as well as fuel valve 24 are fixedly secured to a common shaft 40. A by-pass valve 42 having inlet and outlet pressure acting thereon serves to maintain a constant fluid pressure available for operation of the servo system. A passage 44 establishes communication between chamber 38 and the volume between pistons 12 and 14. A passage 46 containing an orifice 48 provides for the ingress of fluid pressure to chamber 26. A shoulder 50 integral with casing 10 provides a stop for piston 12.

In operation, fuel from a high pressure source enters inlet port 28 thereafter being controlled as to inlet pressure by the by-pass valve 42. Assuming that the engine with which the system is associated is operated under a static demand for fuel, there is no change in volume of chamber 26 and piston 12 and fuel valve 24 are held stationary. The servo valve 18 is then at a null position with a metering area sufficient to provide a fuel flow equal to that through orifice 48.

A change in engine fuel demand will cause an electrical signal to be transmitted to torque motor 22 which will subsequently produce force acting to displace torque motor armature 20 and cause a repositioning of servo valve 18. The movement of servo valve 18 will be proportional to the electrical signal input to torque motor 22. The piston 12 affected by a change in fluid pressure drop across its face will become unbalanced and move proportionally to the force acting thereon. The null pressure drop across servo valve 18 as well as bellows 16 will therefore be re-established and fuel valve 24 will occupy a different position.

Should a condition of excess piston loading arise, due to dirt or other contaminants acting against the sliding surfaces of pistons 12 or 14, the loading of piston 12 will increase and a variation in null pressure drop occurs across servo valve 18. This same pressure drop will also occur across bellows 16 thus developing a force which displaces the torque motor armature 20 against spring 34. The bellows force thus produced causes a repositioning of servo valve 18 so that the change in metering area will permit the same flow through servo valve 18 as through orifice 48 thereby establishing the null position in spite of the change in pressure. In addition, the bellows supplies any force needed to compensate for the change in pressure force acting against servo valve 18. The action of the bellows will obviate any effect on the null current to the torque motor since the action of the bellows force against armature 20 will re-establish the null position of the servo valve regardless of the input signal to the torque motor. A subsequent input signal will cause normal actuation of armature 20 and servo valve 18.

Extreme positions of servo valve 18 will occur when the valve is fully open or fully closed. These positions will exist when the loading of piston 12 is, respectively, at a minimum or a maximum thus providing limiting means for reaction to establish the null position of servo valve 18.

The bellows compensation described herein is not limited to electrically operated devices. The input signal may be a mechanical force acting on the elastically supported servo valve to produce valve displacement proportional to the input force. The principle of operation is exactly the same whether the means introducing the control function is a torque motor and an armature, or a hydraulic unit having as its output a shaft rotation.

I claim:

1. A device for automatically compensating for variations of servo pressure in a hydraulic servo system comprising, in combination, a fluid chamber, means restricting fluid flow into said fluid chamber, means controlling fluid flow out of said fluid chamber, means slidably disposed in said fluid chamber and responsive to a null pressure drop deviation across said second named means, fluid pressure responsive means responsive to the pressure drop across said second named means for sensing variations of force loading on said slidable means, and means transmitting a response of said fluid pressure responsive means to said second named means thereby positioning said second named means to permit a flow of fluid therethrough equal to that through said first named means.

2. A device for automatically compensating for variations of servo pressure in a hydraulic servo system comprising in combination, a fluid chamber, means restricting flow into said chamber, a valve for controlling fluid flow out of said fluid chamber, a movable wall disposed in said fluid chamber and responsive to a null pressure drop deviation across said valve, a bellows, a fluid connection between said bellows and said chamber, said bellows being responsive to variations of force loading on said movable wall, means including a lever pivotally mounted on a support member and operatively connected at opposite ends to said valve and said bellows, respectively, and a spring member operatively mounted to said lever for loading said lever in opposition to said bellows, said last named means being operative to transmit a response of said bellows to said valve thereby positioning said valve to permit a flow of fluid therethrough equal to that through said first named means.

3. A device for automatically compensating for variations in servo pressure in a hydraulic servo system comprising in combination, valve means responsive to an input signal to said servo system, a calibrated restriction in series flow relationship with said valve means, said valve means and said calibrated restriction being operative to establish a control pressure, a bellows, a first fluid connection communicating said bellows with said control pressure, a second fluid connection communicating said bellows with the fluid pressure downstream from said valve means, said bellows being responsive to said control pressure, and means translating movement of said bellows to movement of said valve means to establish a null pressure drop across said valve means, said calibrated restriction and said bellows said valve means being actuated toward a closed position by said bellows in response to an increase in said control pressure and toward an open position in response to a decrease in said control pressure.

4. A device as set forth in claim 3 wherein said bellows provides a force to compensate for a change in pressure force acting against said first named means.

5. In a hydraulic servo system comprising a casing having an inlet port connected to a first pressure source of fluid, an outlet port connected to a second pressure source, a regulating valve for controlling the flow between said inlet port and said outlet port, a first chamber, a piston reciprocable in said first chamber, a shaft operably connecting said piston and said regulating valve, an orifice communicating said first chamber with said inlet port, a second chamber having a fluid connection with said outlet port and with the shaft side of said piston, a passage connected between said first and second chambers, a bellows operably responsive to the fluid pressure differential between said first and second chambers, a servo valve for controlling the effective flow area of said passage, and actuating means operably connected to said servo valve, said actuating means being proportionally responsive to an input signal, said servo valve being actuated by said actuating means to produce a change in servo valve metering area, said piston being responsive to variations of pressure drop across its operating area, said piston response being proportional to said servo valve actuation, said servo valve having a null position thereby establishing a constant pressure drop across said piston and said bellows, said null position creating a constant pressure in said first chamber, said bellows being responsive to any variation in said null pressure drop thereby actuating said servo valve to establish the null position thereof regardless of said first chamber fluid pressure.

6. In a hydraulic servo system comprising a casing having an inlet port and an outlet port, a bore in said casing, a piston reciprocable in said bore and together with said bore forming first and second chambers, a conduit connecting said inlet port with said outlet port, a regulating valve in said conduit for controlling fluid flow therethrough, a shaft connected to said piston and said regulating valve, a passage connecting said conduit upstream from said regulating valve with said first chamber, an orifice in said passage for controlling fluid flow therethrough, a third chamber, a passage connecting said conduit downstream from said regulating valve with said third chamber, a branch passage connecting said last named passage with said second chamber, a passage connecting said first chamber with said third chamber, a torque motor and an armature housed in said third chamber, a bellows operatively connected to said armature and responsive to the pressure differential between said first and third chambers, and a servo valve operatively connected to said last named passage and actuated by said armature for controlling the fluid flow between said first and third chambers, said armature being proportionally responsive to an electrical signal impressed on said torque motor, said servo valve being actuated by said armature to cause a change in fluid flow through said last named passage and a corresponding change in the fluid pressure in said first chamber, said piston being proportionally responsive to the pressure change in said first chamber and moving to a position whereby a null pressure drop is established between said first and third chambers, said null position creating a constant pressure in said first chamber, said bellows being responsive to any variation in said null pressure drop thereby actuating said armature to reposition said servo valve and establish a null position thereof regardless of said first chamber pressure.

7. In a hydraulic servo system comprising a casing having an inlet port and an outlet port, a bore in said casing, pressure responsive means reciprocable in said bore and together with said bore forming first and second chambers, a conduit connecting said inlet port with said outlet port, means operatively connected to said pressure responsive means for controlling fluid flow from said inlet port to said outlet port as a function of the position of said pressure responsive means, a passage having a restriction therein communicating said conduit upstream from said means with said first chamber, a third chamber, a passage connecting said first chamber and said third chamber, a conduit connecting said first named conduit downstream from said means with said second chamber and said third chamber, a servo valve operatively connected to said second named passage for controlling fluid flow therethrough, resilient means having fluid connections with said first and third chambers and being responsive to the fluid pressure differential therebetween, rotatably actuated means responsive to a control signal, said servo valve and said resilient means being operatively connected to said rotatably actuated means, said rotatably actuated means being rotated in response to said control signal to cause a proportional actuation of said servo valve and a subsequent change in fluid pressure in said first chamber, said pressure responsive means moving in response to said change in pressure to a position whereby a null pressure drop is established permitting equal flow through said servo valve and said restricted passage, said resilient means responding to any variation in said null pressure drop and rotating said movable means such that said servo valve is repositioned to establish said null pressure drop regardless of the pressure in said first chamber.

References Cited in the file of this patent

UNITED STATES PATENTS

| | | |
|---|---|---|
| 585,377 | Craig | June 29, 1897 |
| 1,718,673 | Wettstein | June 25, 1929 |
| 2,223,712 | Ziebolz | Dec. 3, 1940 |
| 2,310,298 | Kuhl et al. | Feb. 9, 1943 |
| 2,412,490 | Biggle | Dec. 10, 1946 |
| 2,454,946 | Rosenberger | Nov. 30, 1948 |
| 2,668,415 | Lawrence | Feb. 9, 1954 |
| 2,718,896 | Jones | Sept. 27, 1955 |
| 2,731,025 | Neuman et al. | Jan. 17, 1956 |
| 2,767,725 | Long | Oct. 23, 1956 |